May 23, 1961 G. R. BROWN 2,985,194
DIFFERENTIAL PRESSURE RESPONSIVE APPARATUS
Filed Aug. 10, 1956 2 Sheets-Sheet 1
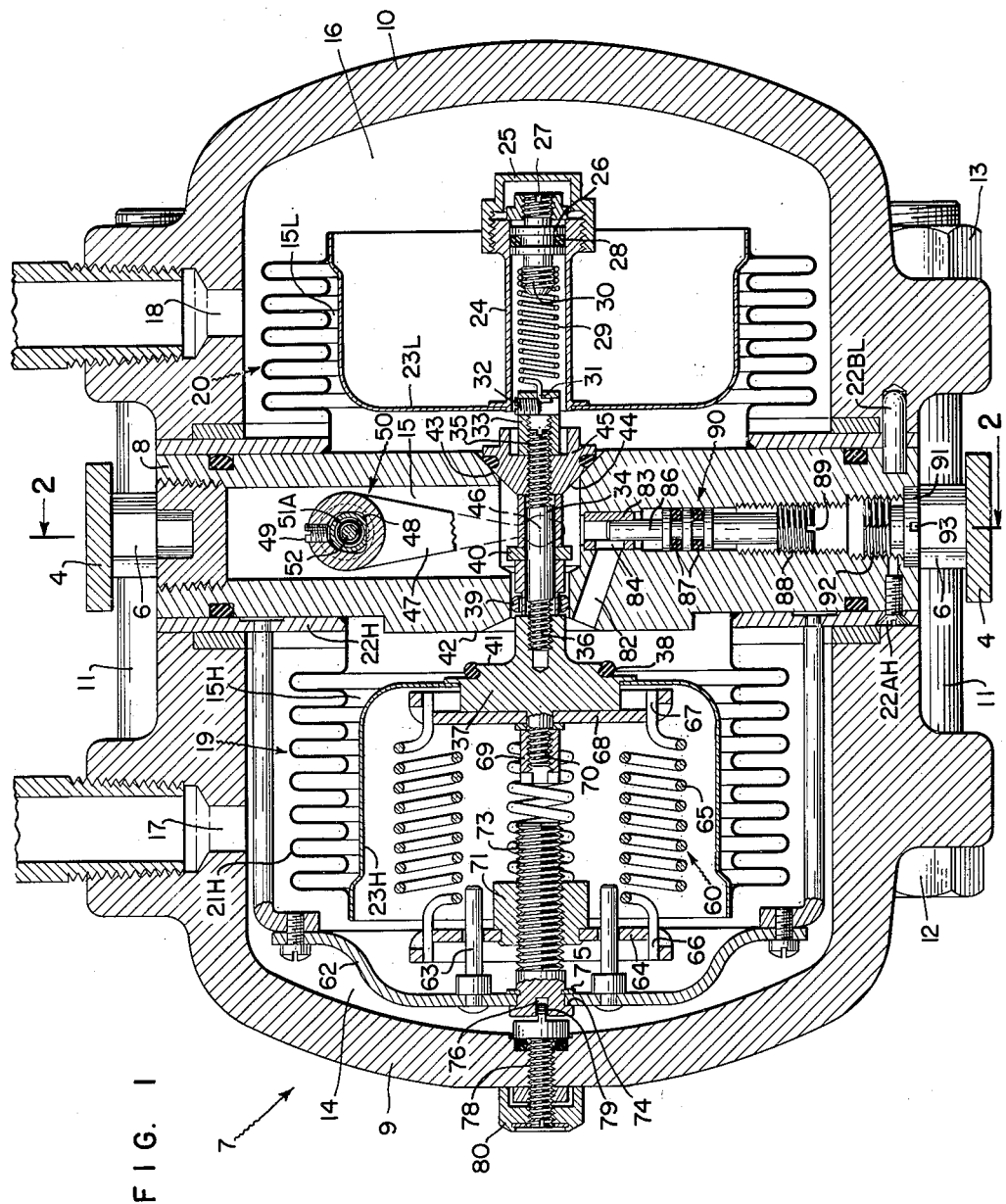
FIG. I
INVENTOR.
GEORGE R. BROWN
BY *Arthur H. Swanson*
ATTORNEY.

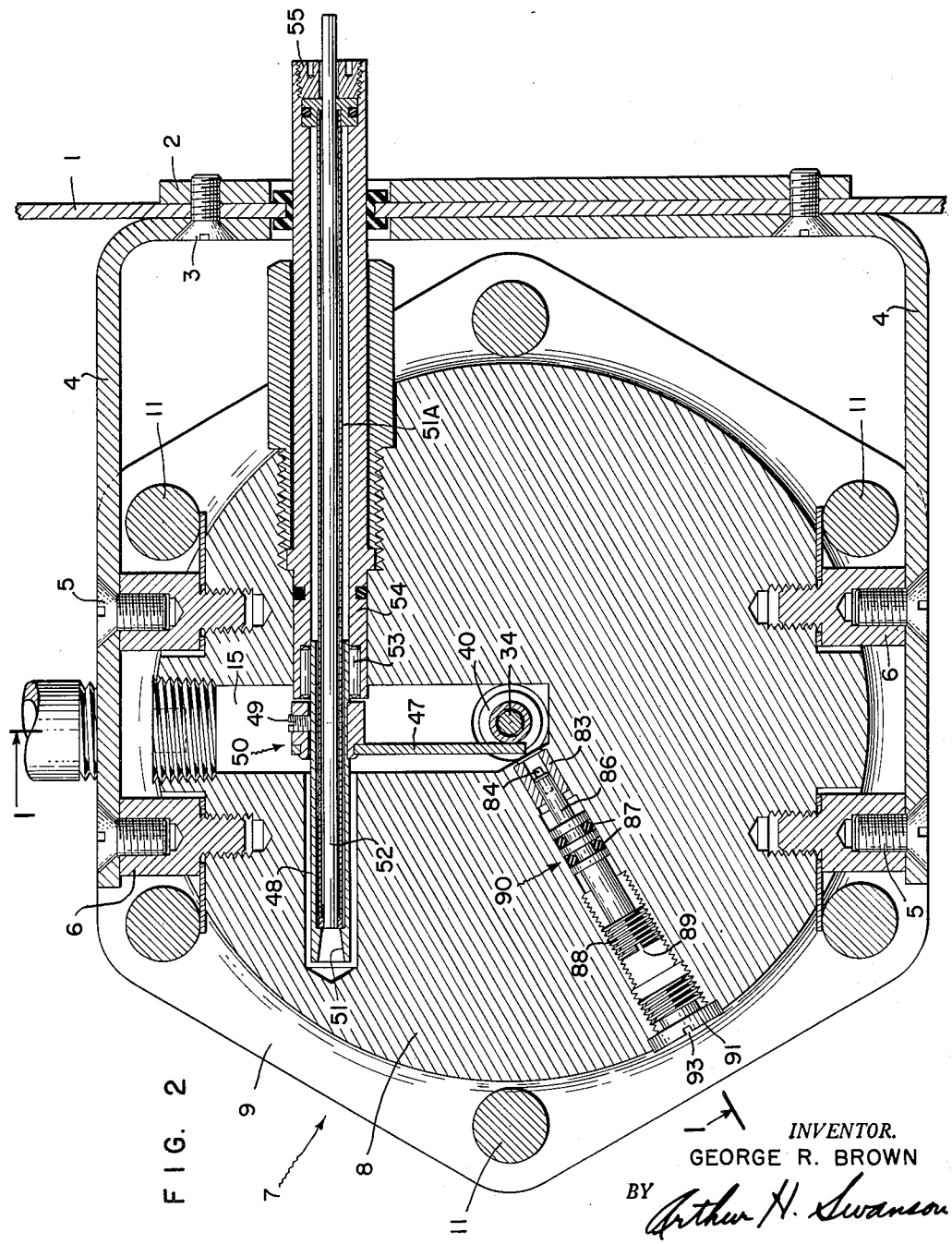

United States Patent Office 2,985,194
Patented May 23, 1961

2,985,194

DIFFERENTIAL PRESSURE RESPONSIVE APPARATUS

George R. Brown, Oreland, Pa., assignor to Minneapolis-Honeywell Regulator Company, Minneapolis, Minn., a corporation of Delaware Filed Aug. 10, 1956, Ser. No. 603,434

7 Claims. (Cl. 137—779)

This invention relates to means for measuring, indicating, and/or recording, and/or controlling in response to a pressure, more specifically, a difference between two pressures. Such devices are particularly useful in connection with flow or the level of a liquid.

The device of this invention comprises a rigid case divided into a high pressure compartment, an intermediate compartment, and a low pressure compartment by two, pressure-responsive, active elements, such as thin-walled bellows. The intermediate compartment is adapted to be divided into three sub-compartments, each separated from the other by one of a pair of sealing valves connected to and actuated by one or both of the pressure-responsive elements. These sealing valves are so arranged that, when an excessive pressure is applied to either of the active elements, the sealing valve connected thereto closes. The closing of this sealing valve traps liquid behind the active element and supports the active element by means of the liquid and the rigid walls of the case against excessive pressure applied thereto. Breaking of the active elements is thus prevented.

It is necessary to compensate pressure-responsive devices such as this against changes in static pressure or ambient temperature applied to them. This is necessary because a change in static pressure or ambient temperature causes the liquid to expand and causes the device to give a false indication. It is one object of this invention to compensate the device against such changes in static pressure or ambient temperature. This compensation is attained by making one of the active elements of slightly different operating characteristics from the other. These operating characteristics may be the effective area and/or the spring gradient. In addition to this difference in operating characteristics of the active element, a stabilizing spring is provided between the movable portion of the active elements and the output element of the device. The action of this stabilizing spring is to permit the active elements to move, due to the expansion of the liquid, and, at the same time, to permit the output element of the device to remain stationary to avoid giving a false indication.

It is a further object of this invention to provide one or more suppression springs and means whereby this suppression spring may be adjusted from the outside of the case so as to provide for the zero or suppression adjustment of the device.

It is a further object of this invention to provide a pulsation damper which prevents small, unwanted changes in the pressure applied to the device from appearing at the output element. The pulsation damper of this invention is of an improved design whereby its action is linear throughout its range of operation.

A better understanding of the present invention may be had from the following detailed description when read in connection with the accompanying drawings, in which:

Fig. 1 is a substantially vertical, longitudinal, cross section on line 1—1 of Fig. 2 as viewed in the direction of the arrows; and Fig. 2 is a vertical, transverse, cross section on line 2—2 of Fig. 1 as viewed in the direction of the arrows.

The pressure-responsive device of this invention is adapted to be mounted on a flat, vertical support 1, such as a panel or instrument board or a portion of an instrument case. A backing plate 2 is secured to support 1 by screws 3 which also support a bracket 4. Bracket 4 is connected by screws 5 to intermediate screws 6 which support the instrument case, generally indicated at 7.

Fig. 1 shows that the instrument case 7 comprises an intermediate disc 8 to which are secured end discs 9 and 10 by means of a plurality of bolts 11 (of which but two are shown), each having head 12 thereon and nut 13 secured thereto. The interior of case 7 is divided into a high pressure chamber 14, an intermediate chamber, and a low pressure chamber 16 by active elements 19 and 20. This intermediate chamber is sub-divided to chambers 15, 15H, and 15L, which are adapted to be filled with a substantially incompressible liquid. Connection 17 conducts high pressure to chamber 14 while connection 18 conducts low pressure to chamber 16.

The active elements 19 and 20 are substantially duplicates so that a description of one of them will suffice. However, the operating characteristics, i.e., the effective area and/or spring gradient, of active element 19 differ from those of active element 20. The same reference characters are applied to the same parts of the active elements distinguished by an H for the high pressure active element 19 and an L for the low pressure active element 20.

Active element 19 comprises a thin-walled, metallic bellows 21H secured at one end to case 7 by a bellows ring 22H which is connected to intermediate disc 8 by a plurality of screws 22AH, of which but one is shown in the drawing. Two pairs of guides, of which but one (22BL) is shown in the drawing, also assist in locating the bellows rings 22H and 22L in their proper position with relation to case 7. At the free end of bellows 21H is secured a cup 23H.

Between chamber 15H and chamber 15 is located a first sealing valve 37. Between chamber 15L and chamber 15 is located a second sealing valve 45. Sealing valves 37 and 45 are actuated from the free or movable end of active element 20 by the following mechanism. Cup 23L has secured to it a tube 24 which has screw threaded engagement with a cap 25 in which is located the head of a screw 26 having a slot or kerf 27 therein. A ring 28 seals screw 26 to tube 24.

The opposite end of screw 26 is secured to end 30 of stabilizing spring 29. The opposite end 31 of stabilizing spring 29 is secured to a nut 33 by means of a set screw 32. Nut 33 has internal screw threads which mate with screw threads 35 on a rod 34 which also has screw threads 36 which mate with screw threads on first sealing valve 37. First sealing valve 37 is shown attached to cup 23H. This is not necessarily the case, as the movement of cup 23H may be transmitted to the rod 34 by means of the liquid in chambers 15H, 15, and 15L. First sealing valve 37 has a valve-sealing ring 38 adjacent its movable valve face 41. A rod-sealing ring 39 seals chamber 15H from chamber 15 so that the communication between chambers 15H and 15 must take place through the pulsation damper to be hereinafter described. Rod 34 also supports a disc 40 which serves to operate the output element of the device as will be hereinafter described. Valve-sealing ring 38 and movable face 41 of first sealing valve 37 cooperate with a stationary valve seat 42 which forms part of the rigid case 7.

The second sealing valve 45 is also mounted on rod 34 and has a movable face 44 which cooperates with a stationary seat 43.

The output element of the device is generally indicated at 50 and comprises a lever 47 having a rounded face 46 which abuts against the vertical face of the actuating disc 40. Lever 47 is clamped by means of set screw 49 to connecting tube 48 which is connected, as by welding or press fit, with one end of a torque rod 52 which is mounted for rotation in the thin-walled torque tube 51A.

A needle bearing 53 supports the torque tube 51A and the torque rod 52 on case 7 by means of a bearing support 54, which has, at its right hand end, a cap 55. The right hand end of torque rod 52 extends out of case 7 and is adapted to have an indicating pointer, a recording pen, or the actuating element of a controller mounted thereon so as to be actuated thereby.

A range or suppression spring assembly is connected between the case 7 and the motion-transmitting linkage between the active elements 19 and 20 and the output element 50. The range or suppression spring assembly comprises a plurality of pillars 61 mounted at their right hand ends on case 7 and supporting at their left hand ends a support 62 which carries a plurality of guide rods 63 thereon. A first disc 64 has holes through it cooperating with guide rods 63. The range or suppression spring, generally indicated at 60, includes a plurality of range or suppression springs 65 each of which has its left hand end 66 secured to first disc 64 and its right hand end 67 secured to second disc 68. Second disc 68 is shown as being secured to the motion-transmitting linkage by means of tube 69 which has internal screw threads mating with screw threads 70 on first valve 37. First disc 64 has a block 71 immovably connected to it. Screw 73 has, on its outer surface, threads which mate with corresponding threads on block 71. Screw 73 is mounted for rotation in support 62 by means of flange 74 and disc 75 which clamp a portion of support 62 between them. Screw 73 has, in its end, a slot or kerf 76 into which projects a blade 79 forming the end of a screw 78 mounted for rotation in end disc 9 and projecting therefrom into engagement with a cap 80.

Means are provided for damping out any unwanted, small changes in pressure which might be transmitted from the liquid in chambers 15H, 15, or 15L to the output member 50. This pulsation damping means is generally indicated at 90 and comprises a conduit 82 connecting chamber 15H to chamber 15. The right hand end of conduit 82 communicates with an elongated slot 84 through the wall of tube 83 which communicates at its inner end with chamber 15. A cylinder 86 is longitudinally movable in sleeve 83 so as to completely close or completely open slot 84 or to occupy any position between these limits so as to vary the amount of opening which slot 84 provides. Cylinder 86 forms one end of a screw 88 which is screw threadedly or otherwise adjustably mounted in intermediate disc 8 and is sealed pressure-tight thereto by ring 87. Screw 88 has a slot or kerf 89 in its end. Plug 91 has screw threads 92 which mate with screw threads in intermediate disc 8. Plug 91 also has a slot or kerf 93 in its end.

The operation of the pressure-responsive device of this invention is as follows. Assume that the pressure in high pressure chamber 14 is balanced by the pressure in low pressure chamber 16 and that the device is therefore at rest. Now assume an increase in the pressure in chamber 14. This causes cup 23H to actuate the motion-transmitting linkage so as to rotate lever 47 about its axis and thereby actuate the output element 50 so as to cause the pointer, pen or actuating element on the end of torque rod 52 outside of case 7 to be moved. This movement of output element 50 will continue until the pressure in chamber 14 plus the force due to the extension of range spring 65 and the compression of bellows 19H is again balanced by the pressure in chamber 16 plus the force due to the extension of bellows 19L.

If the cup 23H is not connected to the motion-transmitting linkage, the movement of active element 19 is transmitted to the output element 50 by means of the liquid in chambers 15H, 15, and 15L so as to cause cup 23L to move and thereby actuate the output element 50 through the stabilizing spring 29 and the remaining portion of the motion-transmitting linkage already described.

If the pressure in chamber 14 becomes excessive, the first sealing valve 37 closes by engagement of its face 41 with the stationary seat 42. Closing of first sealing valve 37 shuts off communication between chambers 15H and 15. Closing of first sealing valve 37 thus traps liquid in chamber 15H. Since this liquid is substantially incompressible, the active element 19 cannot be further compressed and is thereby prevented from being ruptured by the excessive pressure applied to it.

Starting from normal, balanced condition wherein the parts are at rest, if the pressure in chamber 16 were to increase with relation to the pressure in chamber 14, the motion-transmitting linkage would move in the opposite direction. If the pressure in chamber 16 were to become excessive, the second sealing valve 45 would close.

The action of the stabilizing spring 29 in preventing expansion of the liquid in chambers 15H, 15, and 15L from causing output element 50 to give a false indication is as follows. Assume that the static pressure decreases or the ambient temperature increases and that, therefore, the liquid in chambers 15H, 15, and 15L expands. Since the effective area of active element 20 is greater than that of active element 19 cup 23L would tend to move to the right and, in fact, does so. Movement of cup 23L to the right causes stabilizing spring 29 to expand. The increase in the tension of stabilizing spring 29 does not cause its left hand end 31 to move because of the difference between the operating characteristics of active element 19 and those of active element 20 because the force caused by the extension of spring 29 exactly balances the force due to the increased pressure acting on bellows 19. Therefore, the remainder of the motion-transmitting linkage remains at rest and no erroneous indication is transmitted to the output element 50.

The operation of the pulsation damper 90 is as follows. Screw 88 is rotated so as to move plunger 86 axially of sleeve 83 and to thereby vary the amount of slot 84 which is covered by plunger 86. That portion of slot 84 which is not covered by plunger 86 constitutes the smallest cross section of the connection between chamber 15H and chamber 15. This connection is formed of conduit 82, slot 84, and the interior of sleeve 83 which is in communication with chamber 15. As is best seen in Fig. 2, movement of plunger 86 relative to slot 84 causes the area of the opening through slot 84 to vary by small, rectangular increments.

In summary, the differential-pressure-responsive device of this invention is compensated against changes in static pressure or ambient temperature by the provision of actuating elements having different operating characteristics, i.e., effective area and/or spring gradient. This difference in operating characteristics in combination with the stabilizing spring 29 between the active elements and the output element of the device prevents erroneous indications from the device. Since means are provided for varying the tension which the suppression or range springs 65 exert on the motion-transmitting linkage, this adjustment can be made from outside the case without disturbing the pressures to which the device is subjected. By the provision of a pulsation damper 90 whose action is linear throughout its range of motion the ease of adjustment of this pulsation damper is enhanced.

What is claimed is:
1. A differential-pressure-responsive device, including, a rigid case, a pair of active elements each having an operating characteristic different from that of the other and connected to said case to divide it into a high pres- sure chamber and a low pressure chamber including the space between the adjacent sides of said active elements and an intermediate chamber adapted to contain a substantially incompressible liquid in it, a stabilizing spring connected between said active elements of the meter in such a way as to oppose the increase in force applied to said active elements by a change in static pressure or a change in the temperature surrounding said meter, means protecting said meter against an excessive pressure applied to either one of said active elements comprising, a rod connected to at least one of said active elements, a first valve located between the adjacent side of said active element and said intermediate chamber, a second valve located between the adjacent side of the other of said active elements and said intermediate chamber, said valves each including a valve face mounted on and movable with said rod, one of said valves closing upon movement of said rod in one direction and the other of said valves closing upon movement of said rod in the opposite direction, and means protecting said meter from responding to high frequency input comprising, a conduit connected between one of said valves and said intermediate chamber, a tubular sleeve having a rectangular opening through the circular wall thereof, said opening forming part of said conduit, an adjustable valve cooperating with said rectangular opening and controlling the cross section of said pulsation-damping conduit, and means for adjusting said valve to vary the cross section of said conduit.

2. A device responsive to the difference between two pressures, including, a rigid case having a pair of inlet connections passing through the wall thereof and an intermediate chamber therein adapted to contain a substantially incompressible liquid in it, a first thin-walled metallic bellows separating one of said inlet connections from said intermediate chamber, a second thin-walled metallic bellows separating the other of said inlet connections from said intermediate chamber and having an operating characteristic different from that of said first bellows, a compensating spring connected to the movable portion of one of said bellows, a rod connected to said compensating spring at a point spaced from the connection between said compensating spring and said one bellows and connected to the other of said bellows, an output element extending through a wall of said case and having an inner portion located inside said case and in engagement with said rod, a first valve connected between the interior of said first bellows and said intermediate chamber, a second valve located between the interior of said second bellows and said intermediate chamber, said valves including valve faces mounted on and movable with said rod and each adapted to close one of said valves upon movement of said rod in one direction and to close the other of said valves upon movement of said rod in the opposite direction, a pulsation damper comprising a conduit connecting the outlet side of one of said valves and said intermediate chamber, a manually adjustable valve controlling the cross section of a portion of said pulsation-damping conduit, a range spring connected to said rod, and means for adjusting the tension of said range spring passing through said case and having means outside of said case for adjusting the tension of said range spring.

3. A meter responsive to the difference between two pressures, including, a rigid case having a pair of inlet connections passing through the wall thereof and an intermediate chamber therein adapted to contain a substantially incompressible liquid in it, a first thin-walled metallic bellows separating one of said inlet connections from said intermediate chamber, a second thin-walled metallic bellows separating the other of said inlet connections from said intermediate chamber and having an operating characteristic different from that of said first bellows, a stabilizing spring connected to the movable portion of at least one of said bellows, a rod to the other of said bellows and connected to said stabilizing spring at a point spaced from the connection between said stabilizing spring and said one bellows, an output element extending through a wall of said case and having an inner portion located in one of said chambers in engagement with said rod, a range spring connected between said rod and said case, means for adjusting the force of said range spring and passing through said case, and means outside of said case for operating said means for adjusting the force of said range spring.

4. Means for stabilizing a device responsive to the difference between two pressures against errors caused by changes in volume of a fill fluid in the device due to changes in static pressure applied to the device or in the temperature surrounding it, which means include, a rigid case having a hollow interior, a first movable active element in the interior of said case and separating a chamber connected to one of said pressures from an intermediate chamber, a second movable active element in the interior of said case and having an operating characteristic different from that of said first active element and separating said intermediate chamber from a chamber connected to the other of said pressures, said intermediate chamber being filled with a fill fluid, the difference between the operating characteristics of said active elements causing said second active element to move differently in response to a change in volume of said fill fluid than said first active element, an output element passing through the wall of said case and movable and sealed pressure tight therein and connected within said case to said first active element, a stabilizing spring connected between said second active element and said first active element whereby changes in force of said stabilizing spring applied to said first active element, caused by change in volume of said fill fluid, will substantially balance the change in pressure force resulting from said change in volume which said fill fluid imposes upon said first active element, in consequence of which there is substantially no motion of said first active element due to changes in volume of said fill fluid, and means mechanically connecting one of said active elements to said stabilizing spring and manually operable to adjust the tension of said stabilizing spring.

5. Means for stabilizing a device responsive to the difference between two pressures against changes in the static pressure applied thereto or changes in surrounding temperature, said device including, a rigid case having a hollow interior, a first thin-walled metallic bellows having a movable portion dividing the interior of said case into a chamber connected to one of said pressures and an intermediate chamber, a second thin-walled metallic bellows having a movable portion of a different effective area from that of said first bellows and dividing said intermediate chamber from a chamber in the interior of said case and connected to the other of said pressures, said intermediate chamber being adapted to contain a fill fluid in it, an output element passing through the wall of said case and movably mounted and sealed pressure tight therein and connected in said case to said first bellows, a rigid cup comprising the movable portion of said second bellows, a screw rotatably mounted on said rigid cup, and a stabilizing spring connected at one end to said screw so that rotation of said screw renders coils of said spring operative or inoperative and connected at its opposite end to said second bellows in such a way that an increase in the force of said stabilizing spring arising from the change in volume of said fill fluid opposes the increase in force applied to said first bellows by the change in volume of said fill fluid due to a change in static pressure or in the temperature surrounding said meter and causes said first bellows to have substantially no motion due to changes in volume of said fill fluid.

6. Means for stabilizing a device responsive to the difference between two pressures against errors caused by changes in volume of a fill fluid in the device due to changes in static pressure applied to the device or in the temperature surrounding it, which means include, a rigid case having a hollow interior, a first movable active element in the interior of said case and separating a chamber connected to one of said pressures from an intermediate chamber, a second movable active element in the interior of said case and having an operating characteristic different from that of said first active element and separating said intermediate chamber from a chamber connected to the other of said pressures, said intermediate chamber being filled with a fill fluid, the difference between the operating characteristics of said active elements causing said second active element to move differently in response to a change in volume of said fill fluid than said first active element does, an output element passing through the wall of said case and movable and sealed pressure tight therein and connected within said case to said first active element, a stabilizing spring connected between said second active element and said first active element whereby changes in force of said stabilizing spring applied to said first active element, caused by changes in volume of said fill fluid, will substantially balance the change in pressure force resulting from the change in volume which said fill fluid imposes upon said first active element, a plurality of pillars mounted on said case in consequence of which there is substantially no motion of said first active element due to change in volume of said fill fluid, a support mounted on said pillars and spaced from said case, a plurality of guide rods mounted on said support, a first disc having holes through it cooperating with said guide rods, a plurality of range springs each connected to a first disc, and a second disc secured to said range springs and to the movable portion of said first active element.

7. Means for stabilizing a device responsive to the difference between two pressures against changes in the static pressure applied thereto or changes in surrounding temperature, said device including, a rigid case comprising an intermediate disc having an intermediate chamber therein, a pair of flat bellows rings each having a face engaging with one of the sides of said intermediate disc, a pair of cup-shaped end discs each secured at its rim to the face of one of said bellows rings opposite to that engaging said intermediate disc, a plurality of bolts securing said intermediate disc, said bellows rings, and said end discs together into a unitary structure, a first thin-walled metallic bellows having a relatively stationary portion engaged with a portion of one of said bellows rings and spaced from one of said end discs so that said bellows ring overlies that portion of the intermediate disc between said end disc and said bellows and having a movable portion dividing the interior of said case into a chamber connected to one of said pressures and intermediate chamber, a second thin-walled metallic bellows having a stationary portion secured to a portion of the other of said bellows rings and spaced from the other of said end discs so that said other of said ring bellows overlies that portion of the intermediate disc between the rim of said end disc and the stationary portion of said bellows and having a movable portion of a different effective area from that of said first bellows and dividing said intermediate chamber from a chamber in the interior of the other of said end discs and connected to the other of said pressures, said intermediate chamber being adapted to contain a fill fluid in it, an output element passing through the wall of said case and movably mounted and sealed pressure tight therein and connected in said case to said first bellows, and a stabilizing spring connected between the movable portions of said first bellows and of said second bellows in such a way that an increase in the force of said stabilizing spring arising from the change in volume of said fill fluid opposes the increase in force applied to said first bellows by the change in said volume of said fill fluid due to a change in static pressure or in the temperature surrounding said meter and does not cause said first bellows to have any substantial motion due to changes in volume of said fill fluid.

References Cited in the file of this patent

UNITED STATES PATENTS

| | | |
|---|---|---|
| 1,758,644 | Betts et al. | May 13, 1930 |
| 2,400,048 | Jones | May 7, 1946 |
| 2,590,324 | Jones | Mar. 25, 1952 |
| 2,632,474 | Jones | Mar. 24, 1953 |
| 2,659,390 | MacLea | Nov. 17, 1953 |
| 2,664,749 | Jones | Jan. 5, 1954 |
| 2,705,021 | Wiley | Mar. 29, 1955 |
| 2,747,614 | Gray | May 29, 1956 |
| 2,762,392 | Reese | Sept. 11, 1956 |